Figure 1:
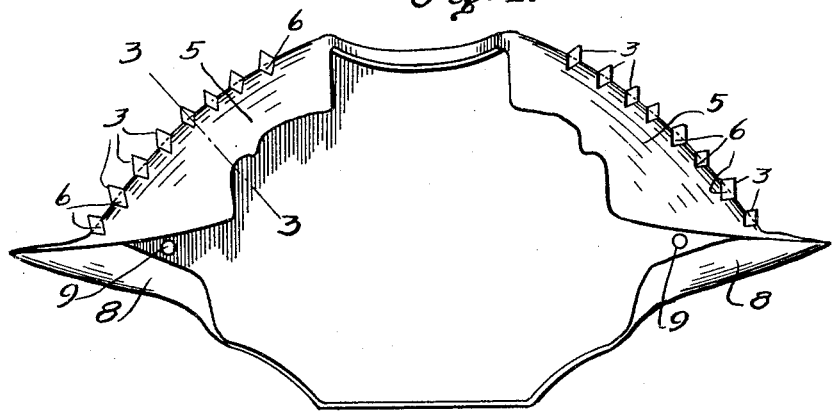

May 23, 1933.         C. M. WINEMILLER         1,911,100
DISH
Filed Oct. 8, 1931

Inventor
Clarence M. Winemiller
By John A. Saul
Attorney

Patented May 23, 1933

1,911,100

UNITED STATES PATENT OFFICE

CLARENCE M. WINEMILLER, OF WASHINGTON, DISTRICT OF COLUMBIA

DISH

Application filed October 8, 1931. Serial No. 567,724.

My invention relates to dishes and to a method of making the same. It is designed more especially for constructing a dish to imitate and take the place of the crab-shell now used in serving crab meat, deviled crabs, and the like. It is generally customary to use the shell of the crab as a dish or receptacle for such food, as is well known. The objection to the shell for such purposes is that it is insanitary in that it is hard to clean, there being many recesses in the same that are hard to reach. It is therefore apparent that bad results are likely to follow such use.

The object of my invention is to produce an article that will simulate or imitate the appearance of the crab shell, and at the same time do away with any objections of the latter. A perfectly sanitary article is thus produced and the appearance of the article preserved. A further object is to produce an article that will be durable, cheap, and easily manufactured.

In the drawing forming a part of the specification, and in which like symbols of reference represent corresponding parts in the several views:—

Figure 2:
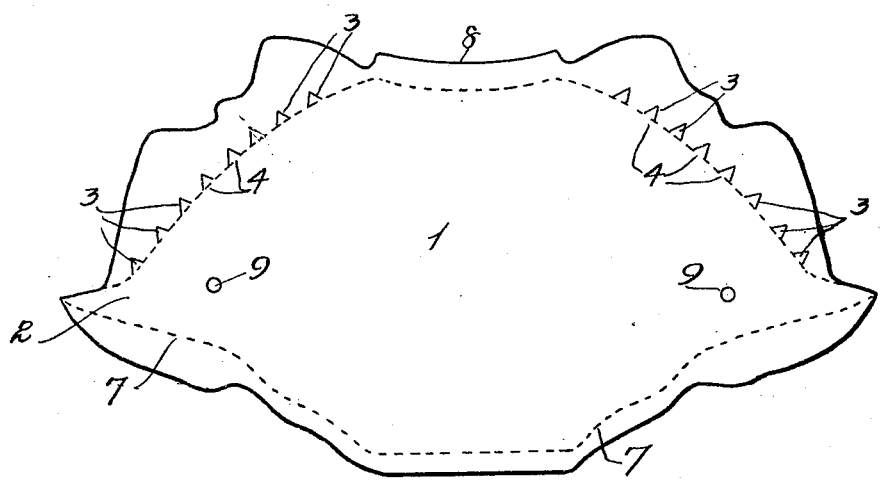
Figure 3:
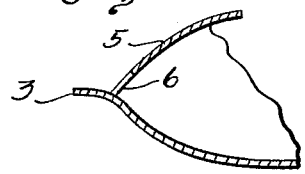

Figure 1 represents the dish in its finished state;

Figure 2 the blank from which the same is formed; and,

Figure 3 a transverse section on the line 3—3, of Figure 1.

In forming my dish I preferably take a blank 1, which would approximate the size of a crab shell when extended. I then cut away a portion 2 at its ends so as to leave an opening at that point, and punch out or otherwise cut the wedge-shaped points 3 that indicate the processes of the crab. The part 4, of course, is not cut, so that when the part 5 is turned over the points 3 project outwardly and an orifice 6 is left above them, said orifice enabling the dish to be easily cleaned.

The margin 7 of the blank is also turned over at the points indicated by the dotted lines. The margin 8 is also turned over on the dotted line; but if desired, may not contact with the other portion, so as to leave an opening at the point; 9 is a perforation formed in the end by means of which the article may be suspended or can be strung together and easily handled.

It will be apparent that other methods of manufacturing the article may be adopted, and that if desired they may be molded or otherwise formed.

The article may be made of any metallic substance, or the like; or it may be formed of porcelain or other suitable material.

Having now fully described my invention, what I claim as new, and desire to secure by Letters Patent, is:—

A dish, having the general appearance of a crab-shell, and formed with a bottom wall and upstanding side walls therearound, some of the side walls being continued and having portions curved inwardly over the bottom of the dish, apertures at the juncture of the side portions and incurved portions, and outstanding projections adjacent the apertures, and extending outwardly from the dish.

In testimony whereof I affix my signature.

CLARENCE M. WINEMILLER.